3,598,733
FIRE RETARDANT POLYMER COMPOSITIONS
Raymond R. Hindersinn, Lewiston, N.Y., and John F. Porter, Durham, N.C., assignors to Hooker Chemical Corporation, Niagara Falls, N.Y.
No Drawing. Original application June 7, 1968, Ser. No. 735,184, now Patent No. 3,530,083, dated Sept. 22, 1970. Divided and this application Dec. 31, 1969, Ser. No. 889,680
Int. Cl. B27k *3/00;* C09d *5/18;* C09k *3/28*
U.S. Cl. 252—8.1                                   7 Claims

ABSTRACT OF THE DISCLOSURE

A fire retardant composition can be formed by use of a fire retarding agent of an arylhaloalkylalkyl phosphonate in combination with an organo halide compound. A typical example is cresyl-2-bromoethylmethyl phosphonate in combination with chlorinated paraffin.

REFERENCE TO PRIOR APPLICATIONS

This is a division of Ser. No. 735,184, now Pat. No. 3,530,083 filed June 7, 1968 which is, in turn, a continuation in part of Ser. No. 390,219, now abandoned filed Aug. 17, 1964.

This invention relates to novel fire retardant polymer compositions, and to methods for rendering polymeric materials fire retardant.

The use of polymeric materials in industrial applications such as in making wire-coatings, pipes, conduits and other industrial moldings and extruded products is expanding each year. These and other uses are better served by polymer compositions that are fire retardant or flame resistant. Many prior art attempts to impart fire resistance to polymers by the use of additives have often adversely affected the desirable properties of the polymer due to the high proportions of fire retardant additive required to be used to achieve an adequate level of fire retardancy.

Accordingly, it is an object of this invention to provide fire retardant polymer compositions. Additionally, it is the object of this invention to provide polymeric materials for additives that not only impart fire resistance but also enhance or preserve other physical properties of these polymers.

In accordance with this invention there is provided a fire retardant polymeric composition wherein the fire retarding agent is an arylhaloalkylalkyl phosphonate in combination with an organohalide compound. Particularly enhanced fire retarding results are obtained when the ratio of arylhaloalkylalkyl phosphonate to organohalide compound is in the ratio of about 2 to 4 parts by weight of arylhaloalkylalkyl phosphonate to 1 part of organohalide compound. The amount of fire retarding agents of this invention employed may vary over a wide range depending upon the exact degree of fire retardant properties desired in relation to other properties of the polymeric composition. However, it is desirable to employ the fire retarding agents of this invention in proportion from about 7½ percent to about 40 percent and preferably from about 9 percent to about 30 percent by weight of the polymeric composition.

The aryl group of the arylhaloalkylalkyl phosphonate employed in this invention is preferably of a single aromatic ring (mononuclear). It is very desirable that the aryl group contain from 6 to 14 carbon atoms. Particularly preferred aryl groups include benzyl, phenyl and cresyl structures.

While all of the halogens having an atomic weight below 100 are suitable in this invention, bromine is particularly useful. Preferably the haloalkyl of the arylhaloalkylalkyl phosphonate is a monohalogen alkyl wherein the alkyl contains from 1 to 10 carbon atoms. Furthermore, the haloalkyl may be branched. The nonhalogen alkyl group preferably contains from 1 to 6 carbon atoms and may be branched. Illustrative examples of the preferred arylhaloalkylalkyl phosphonates are cresyl-2-bromomethylmethyl phosphonate, phenyl-2-bromoethylmethyl phosphonate, phenyl-2-bromopropylethyl phosphonate, phenyl-2-bromoethylpropyl phosphonate, bis(4-phenyl-2-bromoethylmethyl phosphonate)-2,2-propane, bis(phenyl methylene phosphonate)-1,3-dibromo-2,2-propane and the like.

The organohalo compound suitable as a co-acting fire retarding agent of this invention preferably contains either chlorine or bromine as the active halogen, although any halogen having an atomic weight below 100 is satisfactory. It is preferable that these compounds contains at least 50 percent halogen. Illustrative of suitable organohalo compounds for use in this invention include but are not restricted to the following alkyls such as chlorinated paraffin waxes containing 50 or more percent chlorine and tetrabromooctane, alkenyls such as perchloropentacyclo-(5.2.1.0$^{2,6}$.0$^{3,9}$.0$^{5,8}$) - decane, cycloalkyls such a gamma-1,2,3,4,5,6 - hexachlorocyclodecane, and liquid and solid chlorinated polyphenols.

The polymers embraced within the scope of this invention are homopolymers and copolymers of unsaturated aliphatic, cycloaliphatic and aromatic hydrocarbons. Suitable monomers from which they may be made are ethylene, propylene, butene, pentene, hexene, heptene, octene, 2 - methylpropene-1,3-methylbutene-1, 4-methylpentene-1, 4 - methylhexene-1, bicyclo-(2.2.1)-2-heptene, butadiene, pentadiene, isoprene hexadiene, 2,3 - dimethylbutadiene-1,3, 2 - methylpentadiene-1,3, styrene, methylstyrene, 4-vinylcyclohexene, vinylcyclohexene, cyclopentadiene and the like. Especially beneficial results have been obtained when the polymers are polyethylene, polypropylene, polyester resin or polystyrene.

Two of the polymers of this group, polyethylene and polystyrene, have long been known in the art. Low-density (0.92 grams/cc.) polyethylene may be produced by the polymerization of ethylene at a pressure greater than twelve hundred atmospheres and at a temperature of one hundred to three hundred degrees centigrade. Lower pressures of about five hundred atmospheres can be used if a catalyst such as oxygen or benzoyl peroxide is added to the ethylene as described by Fawcett et al., Chemical Abstracts, 32, 1362 (1938).

Polystyrene is readily produced by mass, solution or emulsion polymerization as described in The Technology of Plastics and Resins, Mason, J. P. and Manning, J. F., Van Nostrand Company (1945). The polymerization is promoted by the action of light and catalysts such as hydrogen peroxide, benzoyl peroxide and other organic peroxides. Suitable solvents for solution polymerization are toluene, xylene and chlorobenzene.

In recent years a new field of linear and stereoregular polymers has become available which are suitable for use in this invention. Polymers such as polypropylene are produced with organometallic catalysts and supported metal oxide catalysts as disclosed in great detail in Linear and Stereoregular Addition Polymers: Polymerization With Controlled Propagation, Gaylond, N. G. and Mark, H. F., Interscience Publishers, Inc. (1959). Monomers of the type disclosed hereinbefore are readily polymerized to solid polymers in the presence of a catalyst system comprising aluminum triethyl and titanium tetrachloride or titanium trichloride. The reaction is carried out in the presence of an inert hydrocarbon diluent, suitably purified of catalyst poisons, at a temperature in the range of fifty to two hundred and thirty degrees centigrade. At the conclusion of the reaction, the polymer can be recovered from the resulting solution or suspension by evaporation of the diluent, whereupon the polymer is treated for removal of catalyst residues, for example, by washing with water or alcohol and acids. Metal oxide catalysts, such as chromium oxide supported on silica or alumina, are suitable for polymerizing 1-olefins containing a maximum of eight carbon atoms, with no branching closer to the double bond than the 4-position. Such polymerization may be carried out in the manner described for the organometallic catalyst system.

Other polymers also within the scope of this invention include the polyesters, alkyds and paint vehicles, such as bodied linseed oil, nylon, diallyl phthalates and phthalates, and polycarbonates. Polycarbonates are thermoplastic resins formed from a dihydroxy compound and a carbonate diester. The more important commercial polycarbonates are made from para, para isopropylidenediphenol and phosgene. Polyesters are thermoplastic resins produced by the reaction of dibasic acids and dihydroxy compounds. The unsaturated polyesters can be further polymerized by crosslinking. Alkyds are in many respects similar to polyesters, but alkyds utilize unsaturated fatty acids. Resins within the scope of this invention include the condensation reaction products of phenol and aldehyde, e.g., novolacs, and thermoplastic polymers of bis-(4-hydroxyphenyl)-2,2-propane and epichlorohydrin (trade name of Phenoxy).

the polymer is subsequently removed from the solvent, the additives are intimately mixed with the polymer. Usually the additives are admixed with the polymer in the molten state at temperatures that can range from the melting point to the decomposition temperature of the polymer. Alternatively, the additives of the polymer are dry blended in finely divided state so that an intimate mixture is obtained upon subsequent molding or extrusion.

The invention is illustrated by the following nonlimiting examples. Temperatures are expressed in degrees centigrade and parts are by weight unless otherwise indicated.

In Examples 1 through 22 the fire retardant or burning characteristics of the molded polymer compositions were tested in accordance with the American Society Testing Materials Test Procedure D–635–516 except that the samples were molded in a 9 millimeter glass tube about 7 inches long.

EXAMPLE 1

In this test the polymer bar or rod was ignited for thirty seconds. The burner was then pulled away and the length of time the polymer continued to burn was recorded. The procedure was then repeated on at least two replicate rods. The test compositions and results obtained are given in the table below.

| Example | Parts polymer | Phosphonate Type | Parts | Organohalide Type | Parts | Self-extinguishing (seconds) |
|---|---|---|---|---|---|---|
| I. Polypropylene Compositions ||||||| 
| 1 | 85 | Cresyl-2-bromoethylmethyl phosphonate | 10 | Chlorinated paraffin (70% chlorine) | 5 | (¹) |
| 2 | 90 | ___do___ | 6⅔ | ___do___ | 3⅓ | (¹) |
| 3 | 90 | ___do___ | 10 | | | 60+/60+ |
| 4 | 95 | | | Chlorinated paraffin (70% chlorine) | 5 | 45+/45+/45+ |
| 5 | 100 | | | | | Burns |
| 6 | 90½ | Cresyl-2-bromoethylmethyl phosphonate | 6⅔ | Perchloropentacyclodecane | 3 | (¹) |
| 7 | 91 | ___do___ | 6¾ | ___do___ | 2¼ | (¹) |
| 8 | 92¾ | ___do___ | 6¾ | Tetrabromo-octane | ½ | 2/2/2 |
| 9 | 91 | Phenyl-2-bromoethylmethyl phosphonate | 6¾ | Perchloropentacyclodecane | 2¼ | (¹) |
| 10 | 88 | Phenyl-2-bromopropylmethyl phosphonate | 9 | ___do___ | 3 | 2/3/4/4 |
| 11 | 86⅔ | Bis(4-phenyl-2-bromomethyl phosphonate)-2,2-propane | 10 | ___do___ | 3⅓ | 2/2/2 |
| II. Polystyrene Compositions ||||||| 
| 12 | 100 | | | | | Burns |
| 13 | 95 | | | Chlorinated paraffin (70% chlorine) | 5 | 45+ |
| 14 | 80 | Cresyl-2-bromoethylmethyl phosphonate | 20 | | | 15/17 |
| 15 | 91 | ___do___ | 6¾ | Perchloropentacyclodecane | 2¼ | 4/10/14 |
| 16 | 88 | Phenyl-2-bromopropylmethyl phosphonate | 9 | ___do___ | 3 | 10/0/13/16 |
| 17 | 86⅔ | Bis(4-phenyl-2-bromomethyl-phosphonate)-2,2-propane | 10 | ___do___ | 3⅓ | 1/0/1 |
| III. Polyethylene Compositions ||||||| 
| 18 | 100 | | | | | Burns |
| 19 | 95 | | | Chlorinated paraffin (70% chlorine) | 5 | 45+/45+ |
| 20 | 73⅓ | Cresyl-2-bromoethylmethyl phosphonate | 20 | Perchloropentacyclodecane | 6⅔ | 2/0/0/10 |

¹ Nonburning.

Flameproof polymer compositions are achieved by this invention without the need for the use of an antimony compound such as antimony oxide. In the usual fire retardant polymeric compositions an antimony compound is usually employed if fire retardancy is to be achieved without having a large proportion of the fire retardant material present in the polymeric composition. The use of antimony oxide in polymeric compositions is often objectionable since the antimony compound tends to pigment the composition, greatly increases the specific gravity of the composition, tends to reduce the tensile strength of the composition and may occasionally tend to act as a curing agent. All of the above objections are overcome by the present invention which provides a fire retardant composition for elastomeric compositions, which composition requires no antimony.

The components utilized in the composition of this invention can be admixed by any one of several methods. The additives can be introduced into a polymer when it is dissolved in a suitable solvent. This procedure is especially useful when it is desired to mix the additives during the polymer manufacturing process. When

EXAMPLE 21

In this example the heat distortion properties of the compositions of this invention are compared with such properties of other products.

| Composition | A | B | C | D |
|---|---|---|---|---|
| Components (percent): | | | | |
| Polypropylene | 50.0 | 60.0 | 100.0 | 91.0 |
| Antimony oxide | 16.7 | 13.3 | | |
| Chlorinated paraffin (70% Cl) | 33.3 | | | |
| Perchloropentacyclodecane | | 26.7 | | 2.25 |
| Cresyl-2-bromoethylmethyl phosphonate | | | | 6.75 |
| Total | 100.0 | 100.0 | 100.0 | 100.00 |
| Properties: | | | | |
| Self-extinguishing time, seconds | 45+/45+ | ¹ 0–10 | Burns | 2/2/4/1 |
| Heat distortion point—66 pounds per square inch load, each bar ½″ x ⅛″ x 5″ (degrees centigrade average): | | | | |
| Single bar | 89.5 | 106 | 98 | 102.5 |
| Three bars bolted together | 96 | | 110 | 100 |

¹ NOTE.—The + signifies burning continued after time indicated.

From the foregoing examples, it is evident that the incorporation of arylhaloalkylalkyl phosphonate in combination with an organohalide compound into the ethylenically unsaturated hydrocarbon polymers imparts fire retardance to the polymers by slowing the burning rate in all cases, and by rendering the polymers self-extinguishing or non-burning at higher concentration.

(IV) Polyester compositions

A polyester was prepared by reacting phthalic anhydride, maleic anhydride and propylene glycol. This was then mixed with styrene to form a liquid unsaturated polyester resin. This polyester was used in Examples 22 and 23.

| Example | Parts polymer | Phosphonate Type | Parts | Organohalide Type | Parts | Self-extinguishing (seconds) |
|---|---|---|---|---|---|---|
| 22 | 100 | | | | | Burns |
| 23 | 85 | Cresyl-2-bromo-ethylmethyl phosphonate. | 12 | Perchloropentacyclodecane. | 3 | 2/2/1 |

In addition to the above illustrated organohalide compounds, other fire retardant compositions were prepared when the organohalide compound was gamma-1,2,3,4,5,6-hexachlorocyclohexane or a chlorinated phenol or polyphenyl such as Aroclor 5460 of a specific gravity of 1.670, manufactured by Monsanto Company, St. Louis, Missouri.

A second polyester composition comprising chlorendic acid, maleic anhydride, neopentyl glycol, dissolved in styrene and polymerized to a low pouring content, was prepared.

This polyester was chosen because of its marginal fire retardance under the test conditions. Two 5 inch by 5 inch laminates were prepared for comparative testing in accordance with the American Testing Materials Test Procedure D-757.

| Ingredient | Laminate No. 1 | Laminate No. 2 |
|---|---|---|
| Polyester, gm | 100 | 100 |
| 2-Bromoethylcresylmethyl phosphonate, gm | 0 | 10 |
| Cobalt naphthenate (6%), phr | 0.25 | 0.25 |
| Lupersol DDM, phr | 0.5 | 0.5 |

Both laminates had three piles of glass mat, hand laid up, and rolled to ⅛th inch thickness.

After curing at room temperature for 24 hours at 25° C., the test laminates were post cured at 110° C. in a forced draft oven for one hour. A Barcol hardness of 50–55 was obtained on both laminates after post cure. Specimens of each laminate were subjected to the ASTM D-757 Fire Retardance test with results as follows.

EXAMPLE 24

Laminate #1 (without 2-bromoethylcresylmethyl phosphonate)

| Specimen: | Distance burned, inches | Burning rate, inches/minute |
|---|---|---|
| 1 | 1.875 | 0.625 |
| 2 | 1.870 | 0.623 |
| 3 | 1.875 | 0.625 |
| Average | 1.873 | 0.624 |

EXAMPLE 25

(with 2-bromoethylcresylmethyl phosphonate)

| Specimen: | Distance burned, inches | Burning rate, inches/minute |
|---|---|---|
| 1 | 0.5625 | 0.1875 |
| 2 | 0.7500 | 0.2500 |
| 3 | 0.7500 | 0.2500 |
| Average | 0.6875 | 0.2291 |

V. Phenolic Composition

EXAMPLE 26

Phenolic resin

A phenol formaldehyde resole resin (65% solids) was prepared using 100 parts phenol, 100 parts formaldehyde (as a 37% solution), part sodium hydroxide catalyst, and 2 parts acetic acid for neutralization. The resole was diluted to 65% solids with a solution of water to ethanol (a 3/1 ratio).

A blend was prepared using 13.0 parts of 2-bromoethylcresylmethyl phosphonate, 19.5 parts of the above resole, to give a mixture of roughly 60 parts of resin per 40 parts of phosphonate. Then 54.0 parts of ethanol were added to dilute the materials to roughly a 30% solids concentration.

Into this resulting solution were dipped standard cellulose paper strips 2 inches wide by 6 inches long. The excess was stripped off by passing through rollers. The paper strips were then cured in an air circulating oven at 165° C. for 15 minutes. These cured strips were then tested for fire retardance in accordance with ASTM procedure D777–46 (1965), as follows.

| | Paper No. 1 | Paper No. 2 |
|---|---|---|
| Weight of dry paper (grams) | 1.13 | 1.09 |
| Weight of cured paper (grams) | 1.70 | 1.62 |
| Percent cured add on | 33.5 | 31.5 |
| Char length (inches) | 4⅜ | 4⅝ |

In each case the strips were self extinguishing with no afterglow. Strips treated in the same manner but without 2-bromoethylcresylmethyl phoshonate would have been completely consumed by the test.

It is also within the scope of this invention to use heat stabilizers such as basic lead phosphite, dibutyl tin dilaurylate, basic lead carbonates, and the like. Likewise, other additives such as carbon black, colored pigments and the like can be employed without departing from the spirit of the invention.

Various changes and modifications may be made in the method of this invention and in the composition ratios of this invention, certain preferred forms have been described, and equivalents may be substituted without departing from the spirit and scope of this invention. These modifications are to be regarded as within the scope of this invention.

What is claimed is:

1. A fire retardant agent comprising (1) an arylhaloalkylalkyl phosphonate, wherein the halogen is selected from the group consisting of chlorine and bromine, the aryl group is mononuclear and contains from 6 to 14 carbon atoms, the haloalkyl group is a monohalgen alkyl containing from 1 to 10 carbon atoms, the non-halogen alkyl group contains from 1 to 6 carbon atoms and (2) an organohalide compound containing at least 50 percent halogen selected from the group consisting of alkyl halides, alkenyl halides, cycloalkyl halides, polyphenyl halides and phenol halides.

2. A fire retardant agent according to claim 1 wherein the ratio of arylhaloalkylalkyl phosphonate to organohalide compound is about 2 to about 4 parts by weight of arylhalo phosphonate for each part by weight of organohalide compound.

3. A fire retardant agent according to claim 1 wherein the arylhaloalkylalkyl phosphonate is cresyl-2-bromoethylmethyl phosphonate.

4. A fire retardant agent according to claim 1 wherein the arylhaloalkylalkyl phosphonate is phenyl-2-bromoethylmethyl phosphonate.

5. A fire retardant agent according to claim 1 wherein the organohalide compound is a chlorinated paraffin containing at least 50 percent chlorine.

6. A fire retardant agent according to claim 1 wherein the organohalide compound is perchloropentacyclo-$(5.2.1.0^{2,6}.0^{3,9}.0^{5,8})$ decane.

7. A fire retardant agent according to claim 1 which comprises a combination of about 3 parts of cresyl-2-bromoethylmethyl phosphonate and 1 part of perchloropentacyclo-$(5.2.1.0^{2,6}.0^{3,9}.0^{5,8})$ decane.

No references cited.

JULIUS FROME, Primary Examiner

D. A. JACKSON, Assistant Examiner

U.S. Cl. X.R.

106—15(FP); 117—136; 260—961